United States Patent [19]

Comparetto

[11] 4,325,358
[45] Apr. 20, 1982

[54] SOLAR HEATING APPARATUS

[76] Inventor: John E. Comparetto, 108 Cropper St., Chincoteague, Va. 23336

[21] Appl. No.: 67,503

[22] Filed: Aug. 17, 1979

[51] Int. Cl.$^3$ .................................................. F24J 3/02
[52] U.S. Cl. ...................................... 126/432; 126/438; 126/440
[58] Field of Search ................ 126/438, 440; 165/181; 126/432

[56] References Cited

U.S. PATENT DOCUMENTS

| 855,687 | 6/1907 | Barnett | 165/181 |
|---|---|---|---|
| 1,599,481 | 9/1926 | Marcuse | 126/440 |
| 3,934,573 | 1/1976 | Dandini | 126/440 |
| 4,002,158 | 1/1977 | Radebold | 126/438 |
| 4,043,315 | 8/1977 | Cooper | 126/440 |
| 4,076,025 | 2/1978 | Parker | 126/440 |

FOREIGN PATENT DOCUMENTS 559978  3/1957  Italy .................................. 126/270

Primary Examiner—Larry I. Schwartz
Attorney, Agent, or Firm—James C. Wray

[57] ABSTRACT

Solar heat collectors resembling stamen of a flower consisting of a bulbous portion and stem collect heat energy. Lens systems, black bodies and focusing mirrors can be used in conjunction with the above mentioned stamen. The stamen are in clusters with each clusters' stems leading into a central core. A more elaborate version connects a plurality of central cores to a master core for heat transfer or utilization.

The stems of the stamen are flexible to allow for customized installation and deployment. The lengths of stems can be varied for optimum solar contact of their bulbous portions.

The stamen apparatus can be colorfully tinted to enhance the devices esthetics.

20 Claims, 12 Drawing Figures

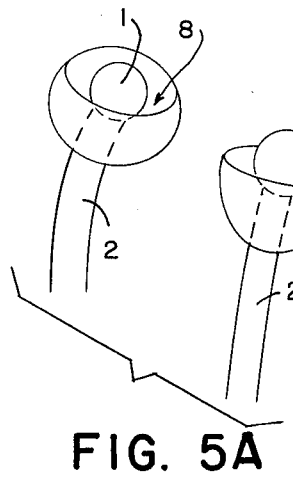
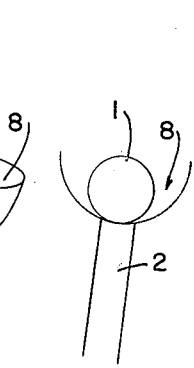
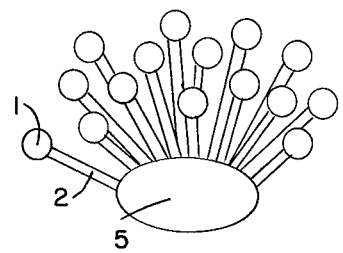
FIG. 5A  FIG. 5B  FIG. 7
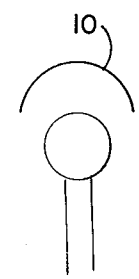
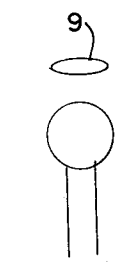
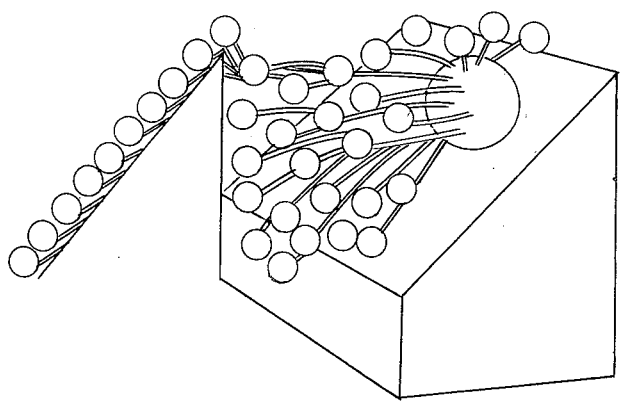
FIG. 6A  FIG. 6B  FIG. 8A
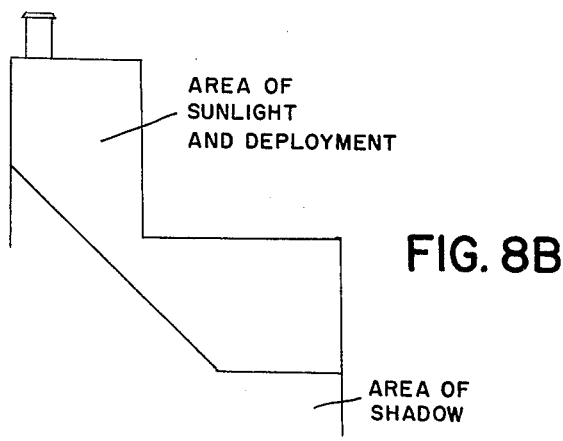
FIG. 8B

SOLAR HEATING APPARATUS

BACKGROUND OF THE INVENTION

There have been many methods and devices to utilize the sun's rays. They have been comprised of laminations containing liquids and gases as well as focusing lenses and mirrors. The amount of solar collection per unit of area has been a drawback to the previous apparatus. Large areas are required for collecting relatively small amounts of useful solar energy and the apparatus involved have been cumbersomely large or esthetically displeasing. The invention herein remedies many of the above deficits and its efficacy will become apparent during the detailed description of the invention.

BRIEF DESCRIPTION OF THE DRAWINGS

FIGS. 5A & B shows the bulbous portion of stamen with enveloping mirrors.

FIGS. 6A & B shows the bulbous portion of stamen with associated convex and Fresnel lenses.

FIG. 7 shows a stamen cluster of unequal stem lengths.

FIGS. 8A & B show examples of the apparatus' deployment in areas of sun exposure dictated by preexisting building structures.

DETAILED DESCRIPTION OF THE INVENTION

Figure 1:
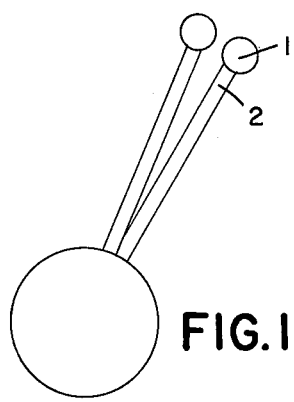
FIG. 1 shows a cross-sectional view of two heat stamen and a central core.
Figure 2:
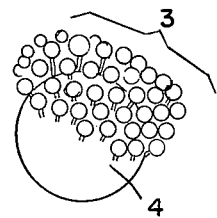
FIG. 2 shows a stamen cluster attached to a spherical central core.
Figure 3:
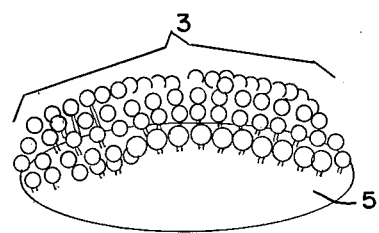
FIG. 3 shows a stamen cluster attached to an ellipsoidal central core.
Figure 4A:
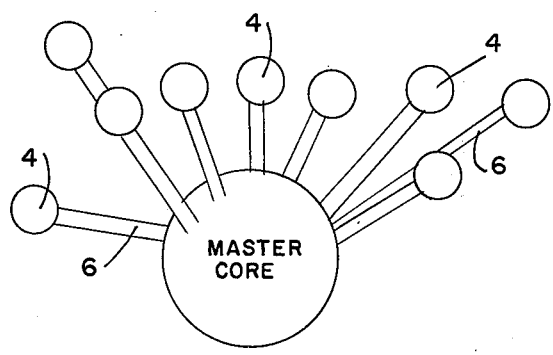
FIGS. 4A & B depict a plurality of central cores connected to a master core.
Figure 4B:
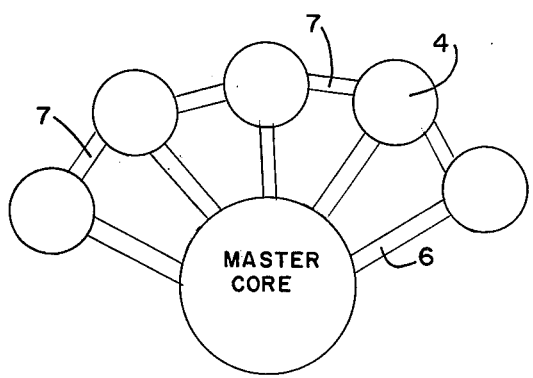

FIG. 1 shows a solar heat collecting apparatus that consists of a bulbous portion 1 and a stem portion 2 herein referred to as the stamen. The stamen are multiple, together forming a cluster. Each cluster 3 is attached to a central core 4 as depicted in FIG. 2. The central core can have any suitable configuration. FIGS. 2 and 3 depict a spherical central core 4 and an ellipsoidal central core 5 respectively. FIG. 4A illustrates heat transfer rods 6 connecting central cores to a master core while FIG. 4B illustrates transfer rods 7 between central cores.

The bulbous apparatus is of a transparent or translucent material for absorption of solar energy. It can be tinted black to enhance absorption or tinted another color for esthetics.

Each bulbous portion in one embodiment of the invention has an enveloping cup shaped mirror 8 (FIGS. 5A & B) that emerges from the stem—bulbous portion junction radiating distally in relief from the bulbous portion. The mirror 8 reflects sunlight to increase the bulbous portions absorption over its lower ½ to ⅔. The upper ½ to ⅓ of the bulbous portion protrudes beyond the periphery of the cup to receive direct sunlight or to receive the sunlight concentrated by convex lenses 9 or Fresnel lenses 10 (FIGS. 6A & B). The outer portion of mirror cup 8 can be colorfully painted to resemble flower petals while the stems 2 can be painted green.

The bulbous portions, stems and cores can be of a solid heat conducting material or may contain a fluid that conducts and convects heat. All areas but the bulbous sun contact portions are coated with an insulating material.

The central cores or the master cores can be of different shapes depicted by spherical and ellipsoidal shape in FIG. 2 and FIG. 3. These would be selected as deployment might dictate. For example; an ellipsoidal shaped central core might be best to arrange stamen clusters that would be arranged to effect the best exposure of bulbous portions at a specific latitude and longitude as dictated by the traversing of the sun during all seasons. Another embodiment of the invention has stamen stems of unequal length to optimize the amount of collective bulbous area exposed to the sun. FIGS. 3 & 7 depict clusters with stamen of unequal length. The two most frequent instances of unequal length stems would be in the above situation where local sun path dictates or in an area of uneven architecture where an even distribution of bulbous areas is desired as depicted in FIG. 8A.

In FIG. 8B the clusters are shown deployed in a geometric pattern to optimize the suns absorption where preexisting building structures block sunlight.

What is claimed:

1. Solar heat collecting apparatus comprising a plurality of bulbous portions subjected to solar energy wherein each bulbous portion is integrally and severally connected to one of a plurality of stem portions that are arranged in a culstered manner, all stem portions being self-supported and individually and integrally connected and terminated in one of a plurality of central cores, said stem portions comprising means for the transfer of heat from said bulbous portions to said control cores, the bulbous portions having cross sections greater than two times respective cross sections of stem portions for direct collection of solar energy by the bulbous portions, and the central cores including means for connection to a master core for transfer of heat thereto.

2. The apparatus of claim 1 wherein each bulbous portion has a partially encircling cup shaped mirror to enhance solar heating by reflective light; the cup shaped apparatus is integrally connected to the stem—bulbous area junction but radiates outward in relief from the bulbous area in a manner to reflect light to the lower ½ to ⅔ of the bulbous area wherein the cup shaped portion allows the upper ½ to ⅔ of the bulbous portion to protrude for direct contact with solar light.

3. The apparatus of claim 1 further comprising a bulbous portion that has a Fresnel type lens between solar energy and said bulbous portion encircling its upper ½ to ¼.

4. The apparatus of claim 1 having convex focusing lens for each bulbous portion affixed between the bulbous portion and the sun for focusing the sun's rays on the bulbous portion.

5. The apparatus of claim 1 comprising transparent or translucent bulbous portions and further comprising insulated stem and core portions.

6. The apparatus of claim 1 wherein the bulbous portion is colored black to enhance heat absorption.

7. The apparatus of claim 1 further comprising within the bulbous stem and core portions a fluid medium capable of transferring heat.

8. The apparatus of claim 1 wherein all bulbous and stem portions are comprised of a solid medium capable of transferring heat.

9. The apparatus of claim 1 further compromising a heat transfer rod or channel integrally connected to the central core of bulbous portion and stem portion for the conveyance of heat to be utilized.

10. The apparatus comprising a plurality of central cores as described in claim 1 that are integrally connected by heat transfer rods to a still larger master core for the storage or utilization of heat.

11. The apparatus of claim 1 that has a spherical central core.

12. The apparatus of claim 1 that has an ellipsoidal central core.

13. The apparatus of claim 1 further comprising flexible stem portions for positioning of the bulbous portions.

14. The apparatus of claim 1 wherein the stem lengths are varied to maximally expose the bulbous portions to the sun.

15. The apparatus of claim 1 wherein the stem lengths are varied to conform with the sun's traversing the sky at the longitude and latitude of deployment.

16. The apparatus of claim 1 wherein the stems are varied in length and are flexibly deployed so as to optimize solar contact while being deployed in awkward or restrictive places.

17. The apparatus of claim 1 wherein the bulbous, cup, and stem portions are colorfully tinted to be esthetically pleasing.

18. The apparatus of claim 1 that has insulated stems, central cores, master cores and heat transfer rods.

19. The master core apparatus of claim 10 that is spherical in shape.

20. The master core apparatus of claim 10 that is ellipsoidal in shape.

* * * * *